United States Patent [19]

Beales et al.

[11] 4,445,754

[45] May 1, 1984

[54] GLASS OPTICAL FIBRES AND GLASS COMPOSITIONS THEREFOR

[75] Inventors: Keith J. Beales, Ipswich; Sally Partington, Colchester; Anthony G. Dunn, Felixstowe, all of Great Britain

[73] Assignee: Post Office, London, England

[21] Appl. No.: 136,325

[22] Filed: Apr. 1, 1980

[30] Foreign Application Priority Data

Apr. 4, 1979 [GB] United Kingdom ............... 7911765

[51] Int. Cl.³ .................... C03B 5/225; C03B 37/075; C03C 3/08; C03C 3/30
[52] U.S. Cl. ................................ 350/96.34; 65/3.11; 65/134; 501/37; 501/65; 501/72; 501/77
[58] Field of Search ................ 65/3.11, 3.2, 32, 134; 350/96.30, 96.34; 501/37, 65, 72, 77

[56] References Cited

U.S. PATENT DOCUMENTS

| | | | |
|---|---|---|---|
| 3,957,342 | 5/1976 | Newns et al. | 350/96.34 |
| 4,023,952 | 5/1977 | Newns et al. | 65/32 |
| 4,094,689 | 6/1978 | van Ass et al. | 501/37 |
| 4,097,258 | 6/1978 | Horikawa et al. | 65/31 |
| 4,275,951 | 6/1981 | Beales et al. | 350/96.34 X |

FOREIGN PATENT DOCUMENTS

| | | | |
|---|---|---|---|
| 2551158 | 5/1977 | Fed. Rep. of Germany | 501/77 |
| 2368444 | 5/1978 | France | |
| 451646 | 11/1974 | U.S.S.R. | 501/37 |
| 583104 | 12/1977 | U.S.S.R. | 501/37 |
| 1507711 | 4/1978 | United Kingdom | |
| 2002341 | 2/1979 | United Kingdom | |

OTHER PUBLICATIONS

87 C.A. 89387y.
84 C.A. 110366r.
Takahashi et al., "Multicomponent Glass Fibers . . ."; Electronic Letters; vol. 14, No. 9; Apr. 27, 1978; pp. 280–281.

*Primary Examiner*—Richard V. Fisher
*Attorney, Agent, or Firm*—Kemon & Estabrook

[57] ABSTRACT

A glass suitable for use as the core glass in a high numerical aperture optical fibre has a composition selected from the range of glasses which comprise
(i) from 15 to 25 mole percent of soda,
(ii) from 25 to 65 mole percent of silica and germania, taken together, the content of germania not exceeding 42 mole percent,
(iii) up to 22.5 mole percent of boric oxide and barium oxide, taken together, the content of boric oxide not exceeding 20 mole percent, and the content of barium oxide not exceeding 12 mole percent, and
(iv) from 0.01 to 1 weight percent of a redox buffering agent. The glass can be prepared by controlling the partial oxygen pressure of the melt so that it is approximately $10^{-5}$ atmospheres. An optical fibre can be produced, by using a soda-boro-silicate clad glass, and a core glass having the composition in the above range.

8 Claims, 4 Drawing Figures

GLASS OPTICAL FIBRES AND GLASS COMPOSITIONS THEREFOR

The present invention relates to high numerical aperture optical fibres, high refractive index glasses for use in such optical fibres, and methods of making such glasses.

The amount of light coupled into an optical fibre is proportional to its (numerical aperture)$^2$ and to the cross sectional area of the fibre core. For short distance optical fibre systems (less than one kilometer in length) efficient power launching into the fibre is of considerable importance. There is thus a need for high numerical aperture, large core fibre for use in short distance systems such as data links, etc.

Three types of high numerical aperture fibre are known in the art, all these suffer from certain disadvantages. Plastic-clad silica fibre with numerical apertures up to 0.35 can be prepared but there is some doubt as to the integrity of the core/clad interface (and coupling is difficult). The modified chemical vapour deposition technique has been used to produce highly doped germania-borosilicate fibre with a numerical aperture of 0.38. However large expansivity mismatch is generated in the pre-forms, which are thus susceptible to shattering on cooling. Fibre with a numerical aperture of 0.53 has been prepared using the double crucible technique with germania-baria-doped core glasses, however, the loss of this fibre has been in excess of 20 dB/km. This work was reported in a paper entitled "Multi Component Glass Fibres with High Numerical Aperture," Electronics Letters, Volume 14, No. 9, page 280. It is believed that the base glass used for these fibres, was a sodium calcium silicate glass. It should be noted that it is well known to use barium oxide and germania to raise the refractive index of a glass.

The present invention relates to the production of high refractive index glasses using a soda-boro-silicate glass as the base glass. It is well known, that in order to minimise the absorption in soda-boro-silicate glasses, due to iron and copper impurities, it is necessary to control the redox state of the glass, so that the partial oxygen pressure is of the order of $10^{-13}$ atmospheres. See United Kingdom Patent Specification No. 1,507;711.

If the standard technique for the preparation of sodium-boro-silicate glasses, is used for the preparation of soda-boro-silicate glasses in which germania, and baria have been added, glass is obtained which has an extremely high scatter loss. The reason for this high scatter loss is uncertain.

We have discovered however that by making the glass under oxidising conditions, the scatter loss is reduced. The use of highly oxidising conditions, results in an unacceptably high absorption loss. If an intermediate redox state is used, a glass is obtained, in which there is a satisfactory balance between absorption loss and scatter loss.

In order that the redox state of the glass is held in a stable state, after preparation of the glass, and during re-melting for fibre production, it is necessary to add, to the initial melt, a redox buffer such as arsenic trioxide, or antimony trioxide.

According to a first aspect of the present invention there is provided a high numerical aperture optical fibre core glass having a composition calculated by taking a notional soda-boro-silicate glass containing 15-25 mole percent of soda, 0-20 mole percent of boric oxide, 25-65 mole percent of silica, and 0.01-1 percent by weight of a redox buffering agent, and replacing up to 12 mole percent of boric oxide by barium oxide, and up to 42 mole percent of silica by germania, said glass having a composition chosen so that it is not subject to devitrification or phase separation, and has a refractive index greater than 1.54, characterised in that said glass has a fictive partial oxygen pressure of $10^{-5}$ atmospheres.

Preferably said redox buffering agent is arsenic trioxide.

According to a second aspect of the invention there is provided a high numerical aperture optical fibre having a core made from a glass having a composition calculated by taking a notional soda-boro-silicate glass, containing 15-25 mole percent of soda, 0-20 mole percent of boric oxide, 25-65 mole percent silica, and 0.01-1 percent by weight of a redox buffering agent, and replacing up to 12 mole percent of borix oxide by barium oxide, and up to 42 mole percent of silica by germania, said glass having a composition chosen so that it is not subject to devitrification or phase separation, and has a refractive index greater than 1.54, characterised in that said core glass has a fictive partial oxygen pressure of $10^{-5}$ atmospheres, and further characterised in that said fibre has a cladding made from a soda-boro-silicate glass having a composition chosen so that it is not subject to devitrification or phase separation.

According to a third aspect of the present invention there is provided a method of making a high numerical aperture optical fibre glass having a composition calculated by taking a notional soda-boro-silicate glass containing 15-25 mole percent of soda, 0-20 mole percent of boric oxide, 25-65 mole percent of silica, and 0.01-1 percent by weight of a redox buffering agent, and replacing up to 12 mole percent of boric oxide by barium oxide, and up to 42 mole percent of silica by germania, said glass having a composition chosen so that it is not subject to devitrification of phase separation, and has a refractive index greater than 1.54, characterised in that said glass is prepared by melting appropriate materials from which the glass is formed and controlling the partial oxygen pressure of the melt by bubbling pure dry carbon dioxide through the molten glass. Stated differently, the core glass composition is selected from the range of glasses which comprise from 15 to 25 mole percent of soda; from 25 to 65 mole percent of silica and germania, taken together, the content of germania not exceeding 42 mole percent; up to 22.5 mole percent of boric oxide and barium oxide, taken together, the content of boric oxide not exceeding 20 mole percent, and the content of barium oxide not exceeding 12 mole percent; and from 0.01 to 1 weight percent of a redox buffering agent. The glass composition is selected such that the refractive index is greater than 1.54, and is prepared, as indicated above, under a controlled partial oxygen pressure. The term redox buffering agent as used herein is to be interpreted as a material which acts as a buffer against changes in the redox state, so that molten glass can be held at a high temperature for a considerable period without major alteration of redox state. In particular the term is to be interpreted as referring to arsenic trioxide, or antimony trioxide.

All glasses referred to in the present specification, contain small quantities of arsenic trioxide (between 0.01% and 1% by weight) as a result of the methods of preparation.

Embodiments of the present invention will now be described by way of example with reference to the accompany drawings in which.

In order to make a high numerical aperture optical fibre, it is necessary to have core glasses and cladding glasses which differ substantially in refractive index, and yet are compatible in terms of their other properties e.g melting point, coefficient of thermal expansion, etc. Several suitable sodium boro-silicate clad glasses are available which cover a range of thermal expansions, and which have refractive index around 1.51. (See UK patent specification No. 1,507,711). The main problem to be overcome is therefore one of developing a high refractive index glass which can be used for the core of the high numerical aperture optical fibre, and which is stable to crystallisation.

High refractive index glasses can be made by adding one or more of the following oxides to a soda-boro-silicate glass; lead oxide, barium oxide, germania, or lanthanum oxide. It is known that glasses containing lanthanum and lead have ultra violet absorption peaks at longer wavelengths than do glasses containing germanium or barium. For this reason germanium and barium containing glasses should exhibit a lower absorption at 850 nm–900 nm (the GaAs and GaAlAs LED emitting wave-length) due to tails from the ultra violet absorption peaks than either lanthanum or lead containing glasses.

Figure 2:
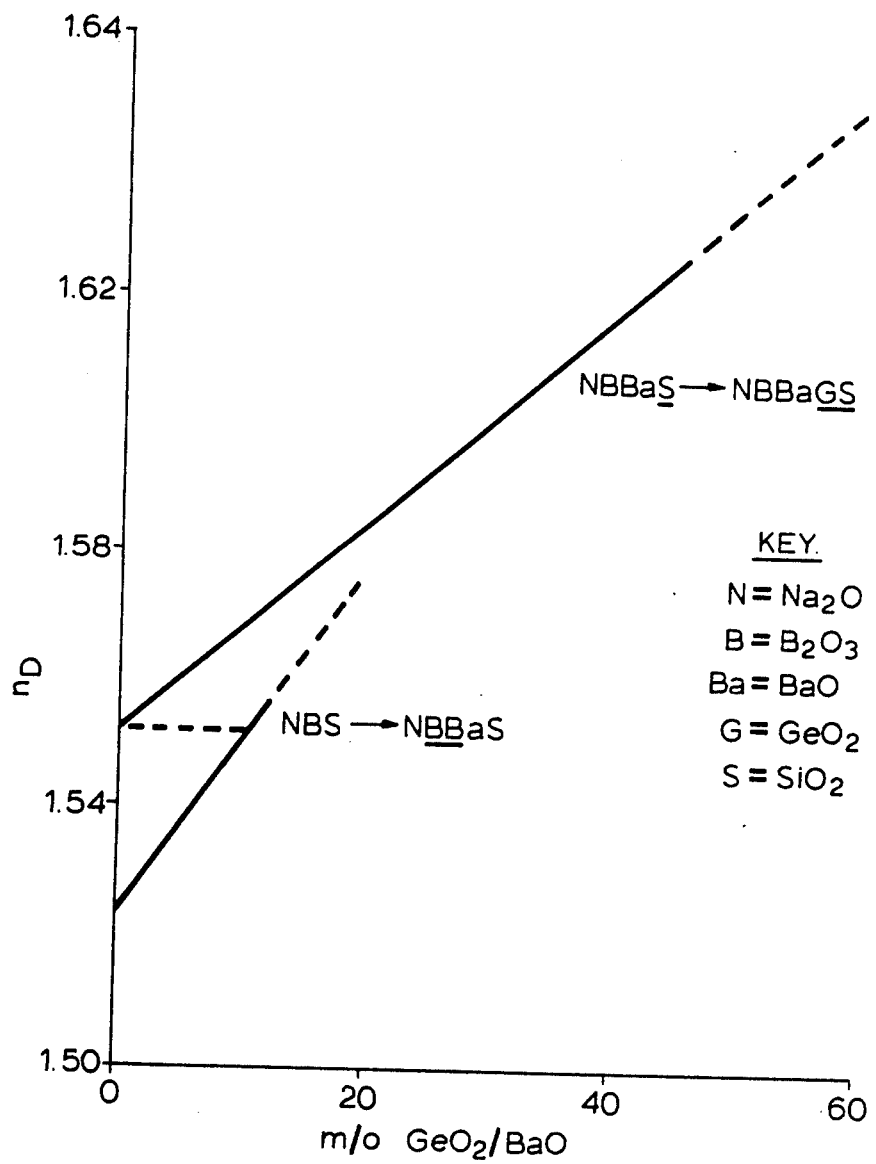
FIG. 2 is a graph showing the effect on refractive index of substituting germania for silica, in a sodium-boro-barium silicate glass.

Appropriate glass composition for use as the core glass of high numerical aperture optical fibres were determined by preparing a series of glasses in which increasing amounts of barium oxide or germanium oxide were systematically incorporated into a soda-boro-silicate glass (having a composition of 20 mol % soda, 20 mol % boric oxide, and 60 mol % silica). The barium oxide was added by mol % replacement of boric oxide. The influence of these additions on the refractive indices and stabilities of the resulting glasses is shown in FIG. 2.

TABLE I

SODA-BORO-GERMANIA-SILICATE GLASSES

| Mol % $SiO_2$ | Mol % $Na_2O$ | Mol % $B_2O_3$ | Mol % $GeO_2$ | Refractive Index | Stable |
|---|---|---|---|---|---|
| 45 | 20 | 20 | 15 | 1.5461 | Yes |
| 40 | 20 | 20 | 20 | 1.5541 | Yes |
| 0 | 20 | 20 | 60 | 1.6175 | No |
| 60 | 20 | 15 | 5 | 1.5289 | Yes |
| 60 | 20 | 10 | 10 | 1.5314 | Yes |
| 60 | 20 | 5 | 15 | 1.5345 | Yes |
| 60 | 20 | 0 | 20 | 1.5379 | No |
| 30 | 20 | 20 | 30 | 1.5714 | Yes |
| 60 | 20 | 2.5 | 17.5 | 1.5385 | Phase Separated |
| 15 | 20 | 20 | 45 | 1.5904 | Yes |
| 10 | 20 | 20 | 50 | 1.6015 | Yes |
| 5 | 20 | 20 | 55 | 1.6039 | No |

TABLE II

SODA-BORO-BARIUM-GERMANIA-SILICATE GLASSES

| Mol % $Na_2O$ | Mol % $B_2O_3$ | Mol % BaO | Mol % $GeO_2$ | Mol % $SiO_2$ | Refractive Index | Stable |
|---|---|---|---|---|---|---|
| 20 | 8.3 | 11.7 | 8 | 52 | 1.5692 | Yes |
| 21 | 8.22 | 11.58 | 7.92 | 51.48 | 1.5601 | Yes |
| 20 | 8.3 | 11.7 | 20 | 40 | 1.5823 | Yes |
| 20 | 8.3 | 11.7 | 25 | 35 | 1.5916 | Yes |
| 20 | 8.3 | 11.7 | 30 | 30 | 1.5999 | Yes |
| 20 | 8.3 | 11.7 | 35 | 25 | 1.6091 | Yes |
| 20 | 8.3 | 11.7 | 12 | 48 | 1.5688 | Yes |
| 20 | 8.3 | 11.7 | 60 | 0 | 1.6503 | No |
| 20 | 8.3 | 11.7 | 40 | 20 | 1.6162 | Yes |
| 20 | 8.3 | 11.7 | 45 | 15 | 1.6230 | No |
| 20 | 8.3 | 11.7 | 50 | 10 | 1.6331 | No |
| 20 | 8.3 | 11.7 | 42.5 | 17.5 | 1.6222 | No |

TABLE III

SODA-BORO-BARIUM SILICATE GLASSES

| Mol % $Na_2O$ | Mol % $B_2O_3$ | Mol % BaO | Mol % $SiO_2$ | Refractive Index | Stable |
|---|---|---|---|---|---|
| 20 | 7.5 | 12.5 | 60 | 1.5541 | No |
| 20 | 8.3 | 11.7 | 60 | 1.551 | Yes |
| 20 | 7.5 | 15 | 57.5 | 1.5538 | No |
| 15 | 10 | 20 | 55 | 1.5785 | No |
| 12.5 | 10 | 12.5 | 55 | 1.5700 | No |
| 22 | 5 | 18 | 55 | 1.5689 | No |
| 15 | 10 | 15 | 60 | 1.5673 | No |
| 20 | 10 | 10 | 60 | 1.5501 | Yes |
| 25 | 5 | 10 | 60 | 1.5458 | Yes |
| 20 | 5 | 15 | 60 | 1.5637 | No |
| 22.5 | 7.5 | 10 | 60 | 1.5477 | Yes |
| 25 | 7.5 | 7.5 | 60 | 1.5403 | Yes |
| 22.5 | 10 | 7.5 | 60 | 1.5418 | Yes |
| 20 | 12 | 8 | 60 | 1.5451 | Yes |
| 20 | 16 | 4 | 60 | 1.5344 | Yes |
| 17.5 | 12.5 | 10 | 60 | 1.5501 | Yes |
| 17.5 | 17.5 | 5 | 60 |  | Yes |
| 17.5 | 10.0 | 12.5 | 60 | 1.5576 | No |
| 22.5 | 5.0 | 12.5 | 60 | 1.5521 | No |
| 17.5 | 7.5 | 15.0 | 60 |  | No |
| 15.0 | 20.0 | 5.0 | 60 | 1.5347 | Yes |
| 15.0 | 17.5 | 7.5 | 60 |  | Yes |
| 12.5 | 20.0 | 7.5 | 60 |  | No |
| 12.5 | 22.5 | 5 | 60 |  | No |
| 15.0 | 22.5 | 2.5 | 60 |  | Yes |
| 12.5 | 25 | 2.5 | 60 | 1.5224 | No |

Table I to III contains a list of various glasses prepared, together with their refractive indices and an indication of their stability against devitrification. Table IV is a list of glasses which are suitable for the purposes of the present invention.

It will be realised that barium oxide is incorporated into the glass as a network modifier, and replaces boric oxide which is a network former. This means that as boric oxide is replaced by barium oxide there is a tendency for the glass to become increasingly unstable against crystallisation. As germania, which is used to replace silica, is a network former in its own right, this problem is not encountered with germania. For this reason it is possible to add considerably more germania to the glass on a mol % basis, than barium oxide, without creating devitrification problems.

It is clear that by replacing boric oxide with barium oxide and silica with germania, an increase in refractive index is produced. These two results can be combined to produce a further series of glasses having a yet higher refractive index. However it is known that large quantities, in excess of 15 mol % of germania in a glass can cause increase in scatter loss. It is therefore advantageous to maximise the use of barium oxide in raising the refractive index. The glass having the highest refractive index from the soda-boro-barium silicate series shown in FIG. 1 (refractive index=1.551, and containing 11.7 mol % barium oxide) is therefore chosen as a parent glass and the silica is systematically replaced by germania.

TABLE IV
GLASS COMPOSITIONS SUITABLE FOR USE AS A CORE GLASS FOR HIGH NUMERICAL APERTURE OPTICAL FIBRES

| Mol % Na₂O | Mol % B₂O₃ | Mol % BaO | Mol % GeO₂ | Mol % SiO₂ | Refractive Index |
|---|---|---|---|---|---|
| 20 | 20 | 0 | 15 | 45 | 1.5461 |
| 20 | 20 | 0 | 20 | 40 | 1.5541 |
| 20 | 20 | 0 | 30 | 30 | 1.5714 |
| 20 | 8.3 | 11.7 | 0 | 60 | 1.551 |
| 20 | 10 | 10 | 0 | 60 | 1.5501 |
| 25 | 5 | 10 | 0 | 60 | 1.5458 |
| 22.5 | 7.5 | 10 | 0 | 60 | 1.5477 |
| 25 | 7.5 | 7.5 | 0 | 60 | 1.5403 |
| 22.5 | 10 | 7.5 | 0 | 60 | 1.5418 |
| 20 | 12 | 8 | 0 | 60 | 1.5451 |
| 17.5 | 12.5 | 10 | 0 | 60 | 1.5501 |
| 20 | 8.3 | 11.7 | 8 | 52 | 1.5692 |
| 21 | 8.22 | 11.58 | 7.92 | 51.48 | 1.5601 |
| 20 | 8.3 | 11.7 | 20 | 40 | 1.5823 |
| 20 | 8.3 | 11.7 | 25 | 35 | 1.5916 |
| 20 | 8.3 | 11.7 | 30 | 30 | 1.5999 |
| 20 | 8.3 | 11.7 | 35 | 25 | 1.6091 |
| 20 | 8.3 | 11.7 | 12 | 48 | 1.5688 |
| 20 | 8.3 | 11.7 | 40 | 20 | 1.6162 |

The refractive indices and stabilities of these glasses are shown in FIG. 2, and it is seen that stable glasses can be produced with refractive indices up to 1.625. The dotted lines in FIGS. 1 and 2 indicate the point at which the glasses become unstable to crystallisation. In FIG. 2 the legend NBS $\overline{\text{NBBaS}}$ is used to denote substitution of barium oxide for boric oxide, similarly the legend NBBa $\overline{\text{NBBaG}}$ is used to indicate the substitution of germania for silica.

Figure 1:
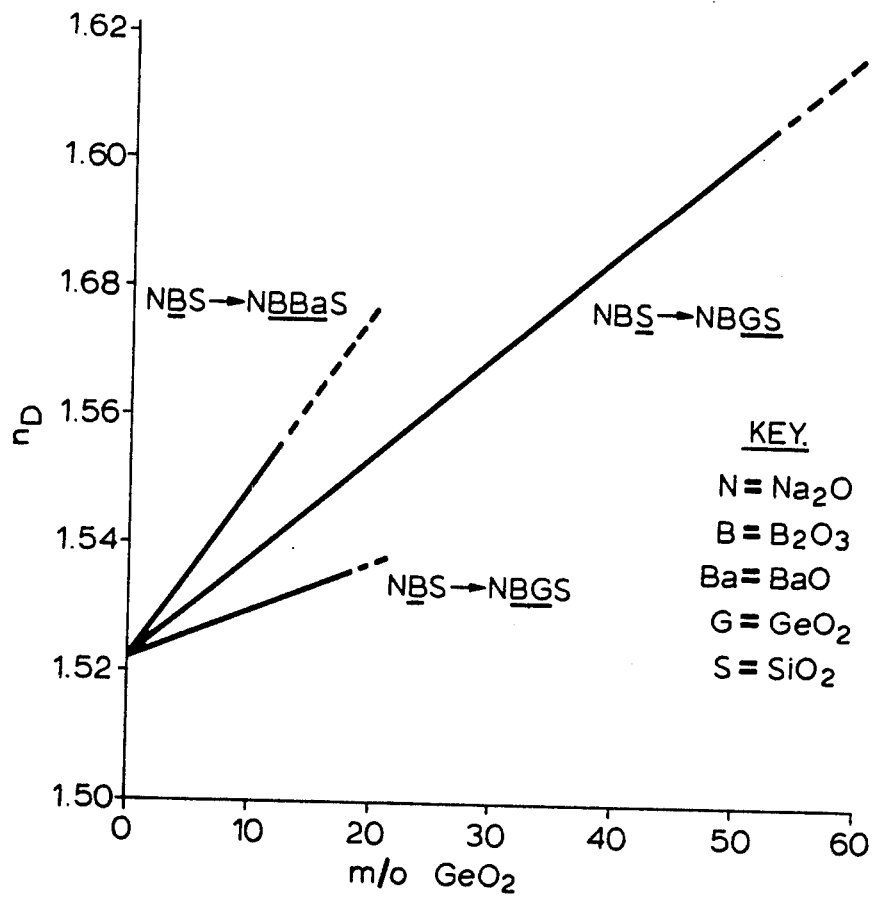
FIG. 1 is a graph showing the effect on refractive index of substituting barium oxide and germania for boric oxide and silica in a sodium-boro-silicate glass.

Similar legends are used to identify the graphs of FIG. 1.

When combined with a suitable cladding glass having a refractive index of 1.51, a range of fibre numerical aperture values up to 0.6 can be realised using the core glasses of the present invention.

EXAMPLES

A core glass having the following composition was selected—20 mol % soda, 8.3 mol % boric oxide, 11.7 mol % barium oxide, 8 mol % germanium oxide, 52 mol % silica. This glass was found to have a refractive index of 1.563 and was expected to give a fibre numerical aperture of the order of 0.43 when combined with sodium boro-silicate clad glass having a refractive index of 1.51. A cladding glass having the composition 15.1 mol % soda, 23.4 mol % boric oxide, and 61.5 mol % silica was selected. The core glass composition was chosen with the object of optimising an acceptable high numerical aperture with minimal scatter loss in the fibre.

The glass was prepared using the technique described in United Kingdom patent specification No. 1,507,711 modified in relation to the gas composition used for bubbling the melt. High purity materials, as described in patent specification No. 1,507,711 were melted in one kilogram batches, and during the melting were bubbled with a dry gas to reduce the water content and to homogenise the glass. Glass rods one centimeter in diameter and two meters in length were drawn upwards from the melt surface. These rods were loaded into a double crucible and a continuous length of fibre was then pulled. Typical pulling temperatures were approximately 1000° C. and the fibre was coated on-line with a silicone resin. The fibre geometry is maintained constant throughout with a fibre outside diameter of 125±1 microns and a core diameter of 72.5±1 microns.

Figure 3:
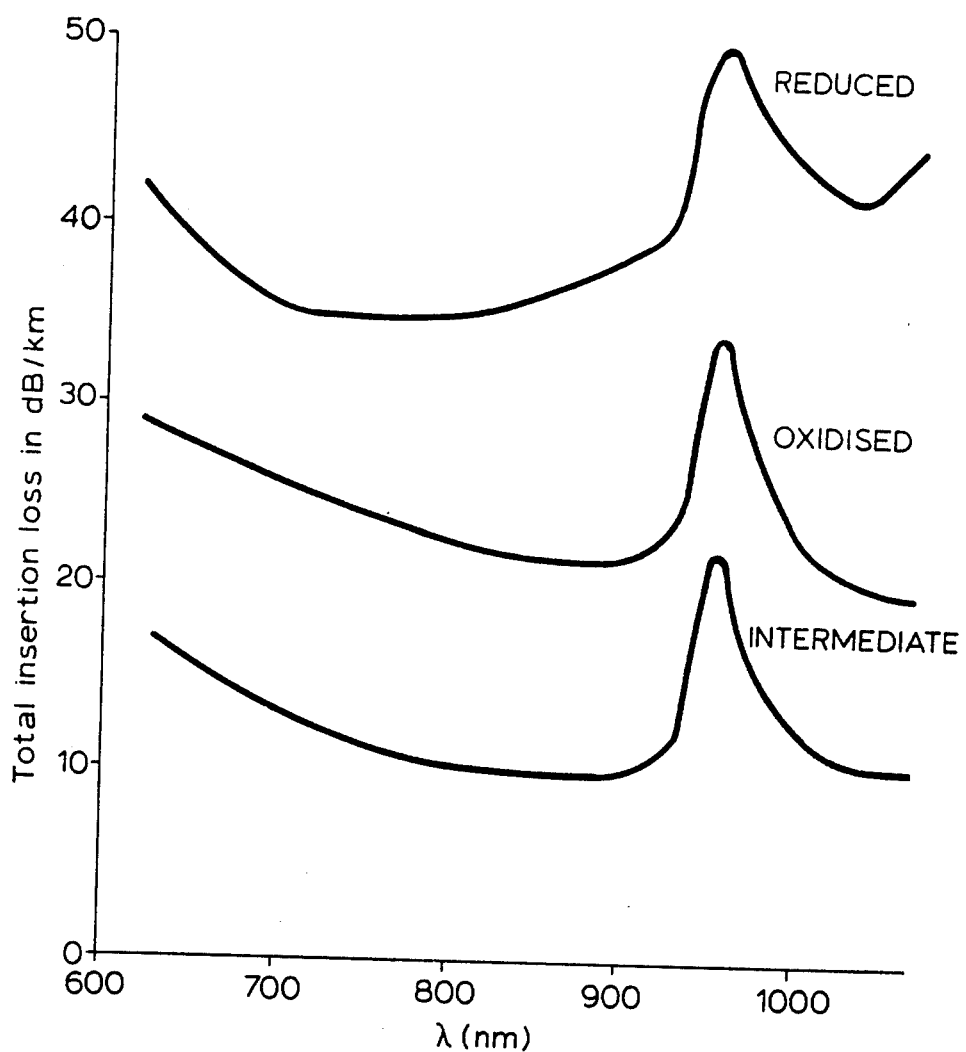
FIG. 3 is a graph showing the effect of redox conditions on total fibre loss for an optical fibre according to the present invention.

The redox conditions during the initial glass melting and subsequent fibre pulling must be carefully controlled in order to reduce the absorption loss due to metallic impurities in the powders—see United Kingdom specification No. 1,507,711. Unfortunately the use of reduced conditions was found to cause volatilisation of germania from the melt, altering the overall glass composition to the point where the glass shows a tendency to crystallise. Three fibre runs were performed under different redox conditions, and FIG. 3 shows the total loss curves obtained for each run.

The glass composition changes caused by the use of reducing conditions (bubbling the glass with a $CO/CO_2$ gas mixture giving a partial oxygen pressure of $10^{-13}$ atmospheres) are reflected in the loss results; although absorption is kept relatively low at 6.5 dB/km, the tendency of the core glass to crystalise results in a very high scatter loss, producing a very high total loss of 35 dB/km.

The use of oxidising conditions (bubbling the molten glass with pure oxygen giving a partial oxygen pressure of 1) eliminated the high scatter loss, so that the glass composition was maintained and the scatter loss was at an acceptably low level. However the absorption loss due to the oxidised impurity transition metals (especially $Cu^{2+}$) was found to be unacceptably high at 18.7 dB/km.

Figure 4:
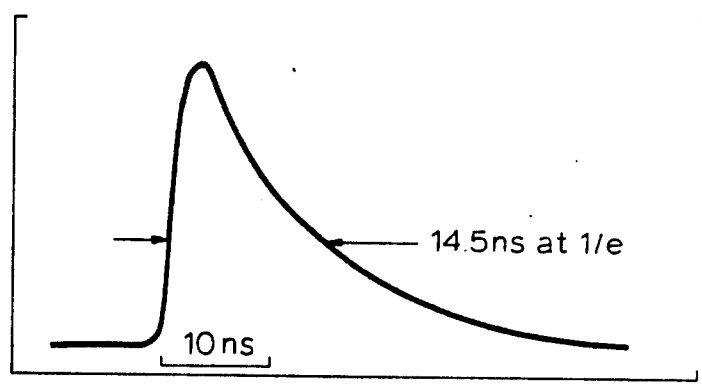
FIG. 4 shows the impulse response of a one kilometer length of a single fibre according to the present invention.

An intermediate redox state was obtained by using carbon dioxide gas (partial oxygen pressure of the order of $10^{-5}$ atmospheres). Under these conditions the scatter loss was maintained at a relatively low value (5.4 dB/km at 800 nm). The partial oxygen pressure of $10^{-5}$ atmospheres was sufficiently reducing to produce a low absorption loss (4.4 dB/km at 800 nm) and thus a fibre of total loss 9.8 dB/km at 850 nm was achieved. A fibre produced in this manner had a numerical aperture measured from the far-field radiation pattern of 0.43, and this was in good agreement with the calculated value. The pulse dispersion of a 1 ns wide input pulse was ~14.5 ns after passing through 1 kilometer (FIG. 4) of fibre cable when a GaAlAs laser was used as the source, and the light was mode scrambled over the first few centimeters.

Four fibres using the different core glasses, having the compositions set out in Table V were prepared, using the technique described above. In each case the fibre had a cladding formed from a glass having a refractive index of 1.5176 and the following composition: 16.15 Mole % Na₂O, 23.09 Mole % B₂O₃, 60.76 Mole % SiO₂. The resultant fibres had the numerical apertures and losses set out in Table VI.

The detailed effect of varying the partial oxygen pressure on total loss of these glasses has not been investigated because of the difficulty in varying partial oxygen pressure around the value of $10^{-5}$ atmospheres. If even small quantities of carbon monoxide or oxygen are added to the carbon dioxide used for treating the glass a substantial change in partial oxygen pressure results. References to a partial oxygen pressure of substantially $10^{-5}$ atmospheres in this specification are therefore to be interpreted as references to the partial oxygen pressure of the glass that results when the molten glass is held in equilibrium with carbon dioxide.

Glasses produced by this technique can be thought of as characterised by the partial oxygen pressure frozen into the glass when the glass cools from the melt, despite the fact that the solid glass may no longer be in equilibrium with its surroundings. These glasses can therefore be regarded as possessing a fictive partial oxygen pressure of $10^{-5}$ atmospheres i.e. a frozen in partial oxygen pressure of $10^{-5}$ atmospheres. This fictive partial oxygen pressure is at least partially stable against remelting of the glass because of the presence of arsenic trioxide in the glass which acts as a redox buffering agent.

It should be emphasized that the core glass described in this specification, can be used with any compatible cladding glass. Typically compatible cladding glasses would have compositions selected from the soda-boro-silicate system. All the glasses referred to in this specification have small quantities of arsenic trioxide as a result of the method of preparation.

TABLE V

| | CORE GLASS COMPOSITIONS | | | | | |
|---|---|---|---|---|---|---|
| | Composition in mole % | | | | | |
| Glass | $Na_2O$ | $B_2O_3$ | $BaO$ | $GeO_2$ | $SiO_2$ | Refractive Index |
| A | 20 | 8.3 | 11.7 | — | 60 | 1,5495 |
| B | 20 | 8.3 | 11.7 | 8 | 52 | 1,5690 |
| C | 20 | 8.3 | 11.7 | 25 | 35 | 1,5916 |
| D | 20 | 8.3 | 11.7 | 45 | 15 | 1,6230 |

TABLE VI

| | FIBRE PROPERTIES | |
|---|---|---|
| Glass No | Fibre N.A | Loss at 850 mm (dB/km) |
| A | 0.32 | 7.2 |
| B | 0.43 | 9.8 |
| C | 0.5 | 11.5 |
| D | 0.6 | 15.2 |

We claim:

1. A high numerical aperture optical fibre core glass comprising soda, silica, germania, boric oxide, optionally barium oxide, and a redox buffering agent, and having a composition selected from the range of glasses which comprise
   (i) from 15 to 25 mole percent soda,
   (ii) from 25 to 65 mole percent silica and germania, taken together, the content of germania not exceeding 42 mole percent,
   (iii) up to 22.5 mole percent of boric oxide and barium oxide, taken together, the content of boric oxide not exceeding 20 mole percent and the content of barium oxide not exceeding 12 mole percent, and
   (iv) from 0.01 to 1 weight percent of a redox buffering agent,
   said composition being selected such that the glass is not subject to devitrification or phase separation and such that the glass has a refractive index greater than 1.54, said glass being characterized by having a fictive partial oxygen pressure of $10^{-5}$ atmospheres produced by melting appropriate materials from which the glass is formed and controlling the partial oxygen pressure of the melt by bubbling pure dry carbon dioxide through the molten glass.

2. A glass according to claim 1, wherein said redox buffering agent is arsenic trioxide.

3. A glass according to claim 2, having the following composition: 20 mole percent of soda, 8.3 mole percent of boric oxide, 11.7 mole percent of barium oxide, 8 mole percent of germania, 52 mole percent of silica and 0.01-1 weight percent of arsenic trioxide.

4. A high numerical aperture optical fibre having a core made from a glass according to any of claims 1 to 3 and a cladding made from a soda-boro-silicate glass having a composition so chosen that it is not subject to devitrification or phase separation.

5. A high numerical aperture optical fibre according to claim 4, wherein said cladding has substantially the following composition: 15.1 mole percent of soda, 23.4 mole percent of boric oxide, and 61.5 mole percent of silica.

6. A method of making a high numerical aperture optical fibre core glass comprising soda, silica, germania, boric oxide, optionally barium oxide, and a redox buffering agent and having a composition chosen from the range of glasses which comprise
   (i) from 15 to 25 mole percent of soda,
   (ii) from 25 to 65 mole percent of silica and germania, taken together, the content of germania not exceeding 42 mole percent,
   (iii) up to 22.5 mole percent of boric oxide and barium oxide, taken together, the content of boric oxide not exceeding 20 mole percent and the content of barium oxide not exceeding 12 mole percent, and
   (iv) from 0.01 to 1 weight percent of a redox buffering agent, said composition being selected such that the glass is not subject to devitrification or phase separation and such that the glass has a refractive index greater than 1.54, comprising the steps of melting appropriate materials from which the glass is formed and controlling the partial oxygen pressure at $10^{-5}$ atmosphere of the melt by bubbling pure dry carbon dioxide through the molten glass.

7. A method according to claim 6, wherein said redox buffering agent is arsenic trioxide.

8. A method according to claim 6, wherein the core glass has the following composition: 20 mole percent soda, 8.3 mole percent of boric oxide, 11.7 mole percent of barium oxide, 8 mole percent of germania, 52 mole percent of silica and 0.01-1 weight percent of arsenic trioxide.

* * * * *